US 11,174,084 B2

(12) United States Patent
Wang

(10) Patent No.: US 11,174,084 B2
(45) Date of Patent: Nov. 16, 2021

(54) DEVICE FOR SECURING PALLETIZED MATERIALS

(71) Applicant: Hualong Wang, Apex, NC (US)

(72) Inventor: Hualong Wang, Apex, NC (US)

( * ) Notice: Subject to any disclaimer, the term of this patent is extended or adjusted under 35 U.S.C. 154(b) by 0 days.

(21) Appl. No.: 16/600,498

(22) Filed: Oct. 12, 2019

(65) Prior Publication Data

US 2021/0107713 A1 Apr. 15, 2021

(51) Int. Cl.
*B65D 71/00* (2006.01)

(52) U.S. Cl.
CPC ............... *B65D 71/0096* (2013.01); *B65D 2571/00067* (2013.01)

(58) Field of Classification Search
CPC .......... B60P 71/02; B60P 71/06; B60P 71/08; B60P 7/02; B60P 7/06; B60P 7/08; B65D 9/20; B65D 65/38; B65D 71/00; B65D 71/0096; B65D 71/02; B65D 2571/00067
USPC ...... 206/83.5, 386, 597; 410/35, 97, 99, 100
See application file for complete search history.

(56) References Cited

U.S. PATENT DOCUMENTS

| | | | |
|---|---|---|---|
| 2,455,237 A | | 11/1948 | Davis |
| 3,371,815 A | * | 3/1968 | Macomber ............. B65D 65/38 206/597 |
| 4,738,371 A | | 4/1988 | Wakeman |
| 4,852,330 A | * | 8/1989 | Carangelo ............. B60P 7/0876 206/83.5 |
| 4,868,955 A | * | 9/1989 | Magnant ................ B65D 63/10 206/597 |
| 4,876,841 A | | 10/1989 | Jensen |
| 5,193,955 A | * | 3/1993 | Chou .................... B60P 7/0823 410/97 |
| 5,226,524 A | | 7/1993 | Guttinger et al. |
| 5,388,702 A | * | 2/1995 | Jones .................... B65D 19/44 150/154 |
| 6,099,221 A | | 8/2000 | Takagi |
| 6,224,260 B1 | | 5/2001 | Nickell et al. |
| 6,948,896 B2 | | 9/2005 | Zhan et al. |
| 6,984,431 B2 | | 1/2006 | Mass et al. |
| 7,934,894 B1 | | 5/2011 | Temple |
| 8,302,267 B2 | | 11/2012 | Morikawa et al. |
| 9,162,805 B1 | | 10/2015 | Testa et al. |
| 9,333,978 B2 | | 5/2016 | Lato et al. |
| 9,540,139 B2 | | 1/2017 | Baltz |
| 9,574,289 B2 | | 2/2017 | Lieber et al. |
| 10,208,409 B2 | | 2/2019 | Lieber et al. |
| 10,336,520 B2 | | 7/2019 | Popp |
| 2007/0289682 A1 | * | 12/2007 | Young .................... B65D 65/02 150/154 |

(Continued)

FOREIGN PATENT DOCUMENTS

CN 203997427 U 12/2014

*Primary Examiner* — Bryon P Gehman
(74) *Attorney, Agent, or Firm* — NZ Carr Law Office PLLC

(57) ABSTRACT

Implementations of the present disclosure generally relate to a reusable wrapping device for securing loaded goods on a transportation carrier. In one embodiment, the wrapping device includes a flexible wrap body having a first side and a second side opposing the first side, and a fastening device removably connected to the flexible wrap body, wherein the fastening device is disposed along the first side of the flexible wrap body. The wrapping device also includes a plurality of straps removably attached to the fastening device.

16 Claims, 14 Drawing Sheets

(56) References Cited

U.S. PATENT DOCUMENTS

2016/0251155 A1\* 9/2016 Lato ................. B60P 7/0876
　　　　　　　　　　　　　　　　　　　410/98

\* cited by examiner

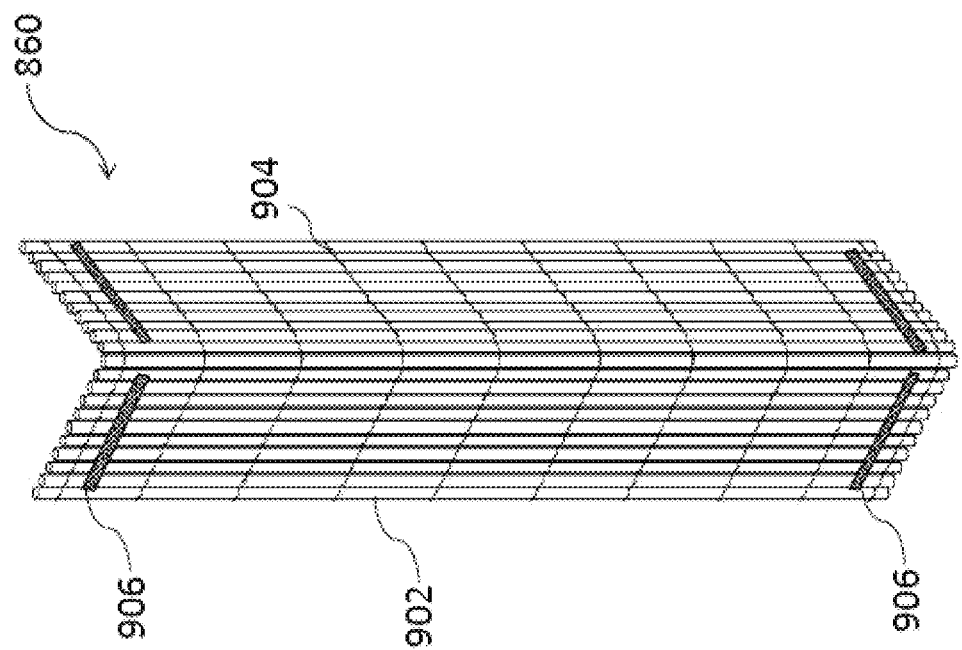
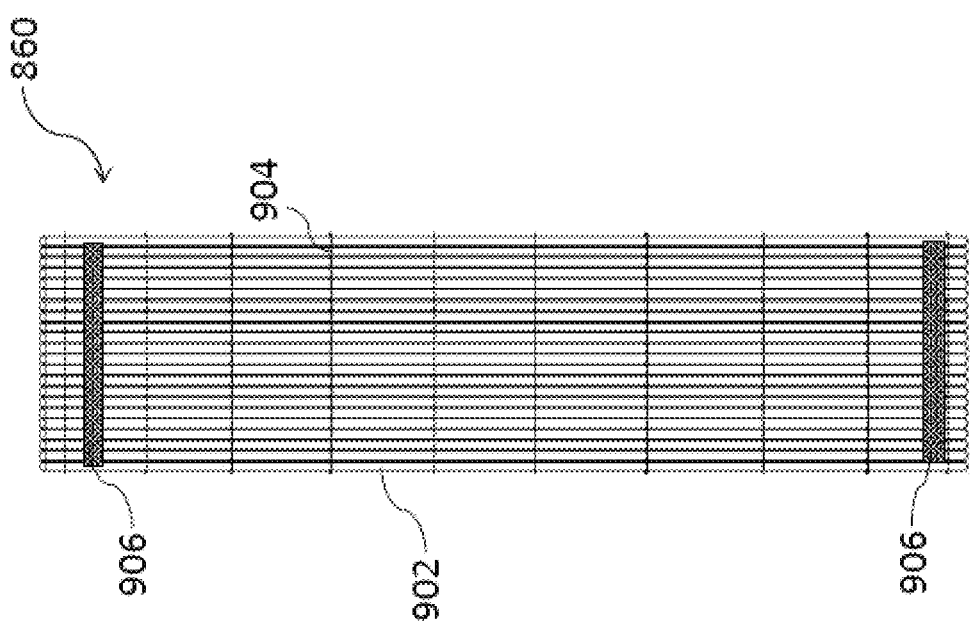
FIG. 9B
FIG. 9A

DEVICE FOR SECURING PALLETIZED MATERIALS

BACKGROUND

Field

Implementations of the present disclosure generally relate to a reusable wrapping device for securing goods to be transported on a transportation carrier.

Description of the Related Art

Transportation carriers such as pallets are commonly used in the industry for moving loads for shipment. Various articles or containers are stacked on pallets to be moved from one place to another using a forklift or other mechanical device. One issue that may arise during transportation of the pallets is that the articles or containers can shift or fall that would require re-loading or even replacement of damaged articles or containers.

One solution to this issue is through the use of a shrink-wrap film that wraps around a pallet to hold the wrapped goods in position. Problems with this method is that the process of removing the shrink-wrap film is labor intensive and time consuming. In addition, the shrink-wrap film can only be used once and require disposal after each use, which is not environment friendly.

Therefore, a need therefore exists for an improved, reusable device for securing goods in position in a palletized load.

SUMMARY

Implementations of the present disclosure generally relate to a reusable wrapping device for securing loaded goods on a transportation carrier. In one embodiment, the wrapping device includes a flexible wrap body having a first side and a second side opposing the first side, and a fastening device removably connected to the flexible wrap body, wherein the fastening device is disposed along the first side of the flexible wrap body. The wrapping device also includes a plurality of straps removably attached to the fastening device.

In another implementation, a wrapping device is provided. The wrapping device includes a flexible wrap body having a first side and a second side opposing the first side, a fastening device removably connected to the flexible wrap body, the fastening device being disposed along the first side of the flexible wrap body, and the fastening device having a first slot and a second slot opposing the first slot. The wrapping device also includes a plurality of u-shaped hooks removably engaged with the first slot. The wrapping device also includes a plurality of straps removably attached to the fastening device.

In yet another implementation a wrapping device is provided. The wrapping device includes a flexible wrap body having a first side and a second side opposing the first side, a fastening device removably connected to the flexible wrap body along the first side. The wrapping also includes a plurality of straps removably attached to the fastening device. The wrapping also includes a plurality of protectors intermittently disposed along a longitudinal direction of the wrap body, the protectors being removably attached to the flexible wrap body and having a height corresponding to a height of the flexible wrap body, and each protector including a plurality of parts formed of a rigid material.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIG. 9A illustrates a perspective view of a portion of a protector according to embodiments of the present disclosure.

FIG. 9B illustrates a perspective view of a portion of a protector being bent to a right-angle according to embodiments of the present disclosure.

Figure 1:
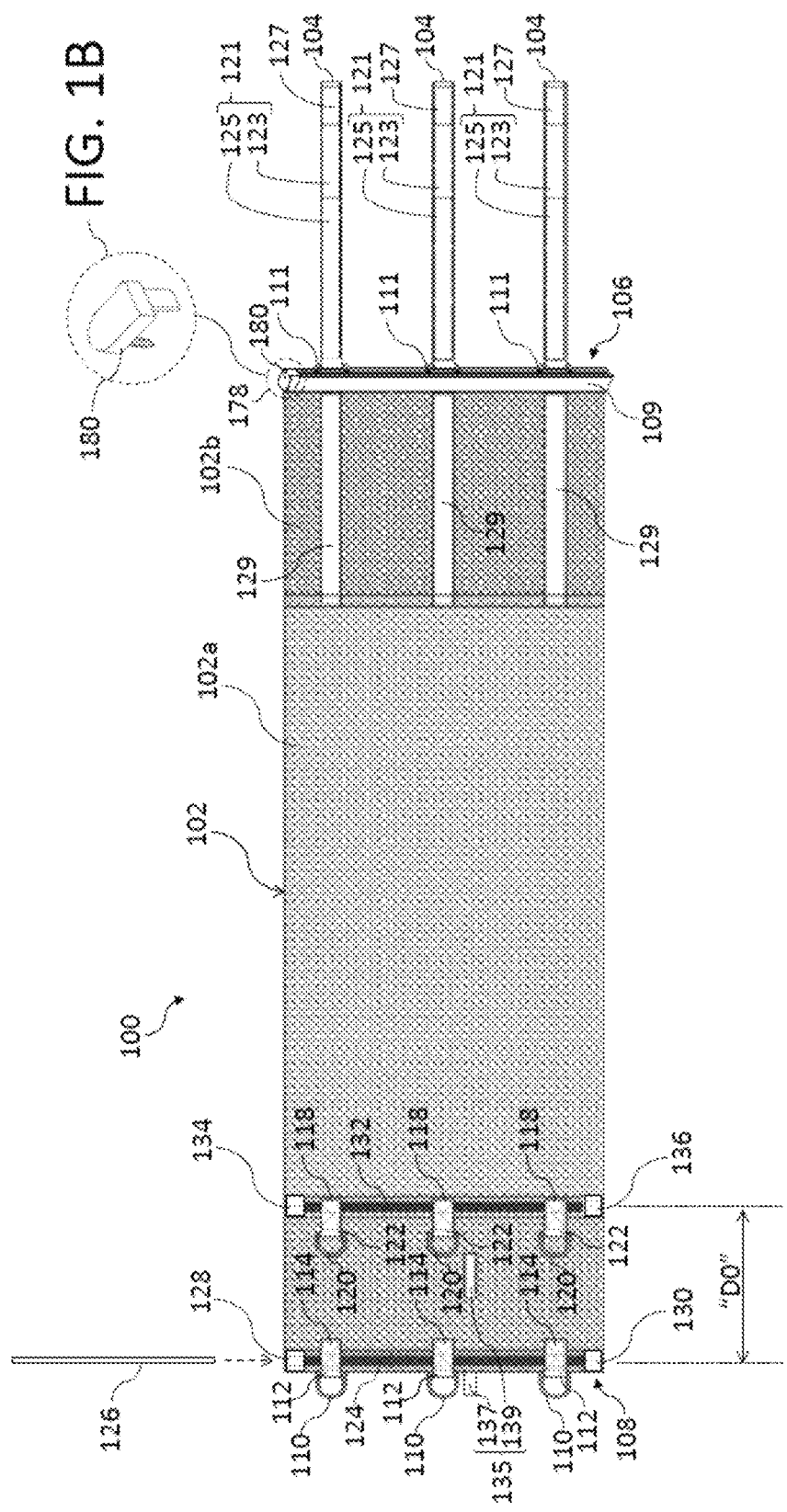
FIG. 1A is a perspective view of a wrapping device according to one embodiment of the present disclosure.
FIG. 1B is an enlarged view of a cap shown in FIG. 1A according to one embodiment of the present disclosure.

To facilitate understanding, identical reference numerals have been used, where possible, to designate identical elements that are common to the figures. It is contemplated that elements and features of one implementation may be beneficially incorporated in other implementations without further recitation. It is to be noted, however, that the appended drawings illustrate only exemplary implementations of this disclosure and are therefore not to be considered limiting of its scope, for the disclosure may admit to other equally effective implementations.

DETAILED DESCRIPTION

The following disclosure describes a wrapping device for securing goods on a transportation carrier, such as a pallet.

Details are set forth in the following description and in FIGS. 1A-12 to provide a thorough understanding of various implementations of the disclosure. Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

FIG. 1A is a perspective view of a wrapping device 100 according to one embodiment of the present disclosure. The wrapping device 100 generally includes a flexible wrap body 102 and a plurality of straps 104. The wrap body 102 has a first side 106 and a second side 108 opposing the first side 106. The straps 104 are attached to the first side 106 of the wrap body 102. The first side 106 and the second side 108 may be the width sides of the wrap body 102. The straps 104 may also be attached to the length sides of the wrap body 102, depending upon the application.

The wrap body 102 is generally rectangular in shape and sized to circumvent or encircle most of the goods on a transportation carrier, such as a pallet. The wrap body 102 may use other shape, e.g., square, trapezoid, or polygons, so long as the wrapping device 100 can wrap around the goods and the pallet and prevent the goods from unwanted movement or shifting during transportation. The wrap body 102 may be a solid sheet of plastic that is flexible and transparent. Alternatively, the wrap body 102 can be separate pieces of flexible material that are sewn, stitched, or otherwise secured together, such as the wrap body 102a, 102b. In either case, the wrap body 102 is fabricated from a lightweight, abrasion-resistant material. Suitable material may include, but is not limited to, polyester, nylon, polypropylene, polyethylene, canvas, composite woven, or any suitable natural or synthetic materials. In one embodiment, the wrap body 102 is made of a mesh fabric having net-like appearance. The wrap body 102 may be coated with vinyl to enhance durability of the wrapping device 100.

In some embodiments, the wrap body 102 may include one or more reinforcing straps 129 to strengthen the durability of the wrap body 102. The reinforcing straps 129 may be formed from the same or similar material to the straps 104. The reinforcing straps 129 can be disposed at the wrap body 102b and equally spaced in accordance with the locations of the straps 104. In one aspect, the reinforcing straps 129 are extended along the longitudinal direction of the wrap body 102.

The straps 104 are a strip of cloth, leather, fabric or any suitable flexible material such as polyester, nylon, polypropylene, polyethylene, canvas, composite woven, any suitable natural or synthetic materials, or any combination thereof. The straps 104 may also be a non-stretching material made of any suitable composite or synthetic material. Each strap 104 may include a hook-and-loop type fastener 121 having a hook part 123 and a loop part 125. In some embodiments, each of the straps 104 can further include a holding part 127. The holding part 127 is configured for ease of grasping by a human operator during the operation.

The number of the straps 104 may be between 2 and 12, for example about 3 to 6. Fewer or more straps may be chosen depending upon the size of the wrap body 102 and/or transportation needs. The wrap body 102 may have a ratio of length-to-width of about 1.5:1 to about 6:1, such as about 2:1 to about 4:1, for example about 3.5:1. The length-to-width ratio may vary so long as the length of the wrap body 102 is sufficient to wrap around loaded goods/boxes on the transportation carrier.

In one embodiment shown in FIG. 1, three (3) straps 104 are provided at the first side 106 of the wrap body 102. The straps 104 can be attached to the wrap body 102 through a plurality of U-shaped hooks 111. The U-shaped hooks 111 are removably connected to a fastening device 109, which is an elongated member configured to engage with the wrap body 102. Details of the fastening device 109, U-shaped hooks 109 and their relationship with respect to the straps 104 and the wrap body 102 will be discussed in more detail in FIGS. 4A and 4B.

A plurality of patches 114 are sewn, stitched, or otherwise secured to the wrap body 102 along the second side 108. Each patch 114 may have a loop 112 sized to receive a connection ring 110. The patches 114 may be arranged at locations corresponding to the U-shaped hooks 111. The connection rings 110 may have a "D" shape or the like that is sized to allow the straps 104 to pass through and wrap around at least a portion of the pallet and loaded goods. The hook-and-loop type fastener 121 of the straps 104 work with the connection rings 110 by permitting the hook-and-loop type fastener 121 of the straps 104 to pass through and fold back and attach to themselves to secure the wrap body 102 around the goods and the pallet.

Optionally, a secondary set of patches 118 and connection rings 120 can be further provided to the wrap body 102 in a similar fashion to the patches 114 and connection rings 110. The connection rings 120 can be retained in a loop 122 of the respective patches 118. The secondary set of patches 118 are arranged at a predetermined distance "D0" from the patches 114. The distance "D0" may be between about 5 inches and about 40 inches, such as about 15 inches to about 30 inches. Greater or less distance "D0" is contemplated depending on the size of the goods and/or the pallet.

A pocket 124 is provided at the second side 108 of the wrap body 102. The pocket 124 may be sewn, stitched, or otherwise secured to the wrap body 102. The pocket 124 is sized to receive a rod 126, which may have a height corresponding to that of the pocket 124. The rod 126 may be formed of aluminum alloy or any suitable lightweight, high-strength material. The rod 126 can be inserted into the pocket 124 through an opening located at an upper and/or bottom end of the pocket 124. The fastening device 109 and the rod 126 provide rigidity or structure for the wrap body 102.

The rod 126 may be retained permanently within the pocket 124 by sealing the top and bottom of the pocket 124 with a tab 128, 130, respectively. Such tabs 128, 130 may be sewn, stitched, or otherwise secured to the wrap body 102. Alternatively, the tabs 128, 130 may be removably attached to the top and bottom of the pocket 124 via the use of hook-and-loop type fasteners or any suitable means such as zippers, clips, buttons, tapes, or the like. The tabs 128, 130 allow the rod 126 to be removed from the wrap body 102 as needed. The pocket 124 and the tabs 128, 130 may be made of flat nylon webbing or other suitable material, such as those used for the wrap body 102. If patches 118 and connection rings 120 are used, a pocket 132 and tabs 134, 136 may be similarly provided to the wrap body 102. In either case, the patches 114 can be disposed on or over the pocket 124 to enhance durability of the pocket 124 to the wrap body 102.

Optionally, a hook-and-loop type fastener 135 may be provided to the wrap body 102. The hook-and-loop type fastener 135 can secure folding of the wrapping device 100 when not in use. The hook part 137 of the hook-and-loop type fastener 135 may be sewn, stitched, or otherwise secured to the second side 108 of the wrap body 102, for example at the edge of the wrap body 102 adjacent to the patch 114. The loop part 139 of the hook-and-loop type fastener 135 may be sewn, stitched, or otherwise secured at a region adjacent to the patch 122. The loop part 139 can have a length greater than that of the hook part 137 to allow easy adjustment of tightness when folding or rolling the wrap body 102. The hook part 137 and the loop part 139 are arranged at about the same height on the wrap body 102 and can be interchanged with one another.

Figure 2:
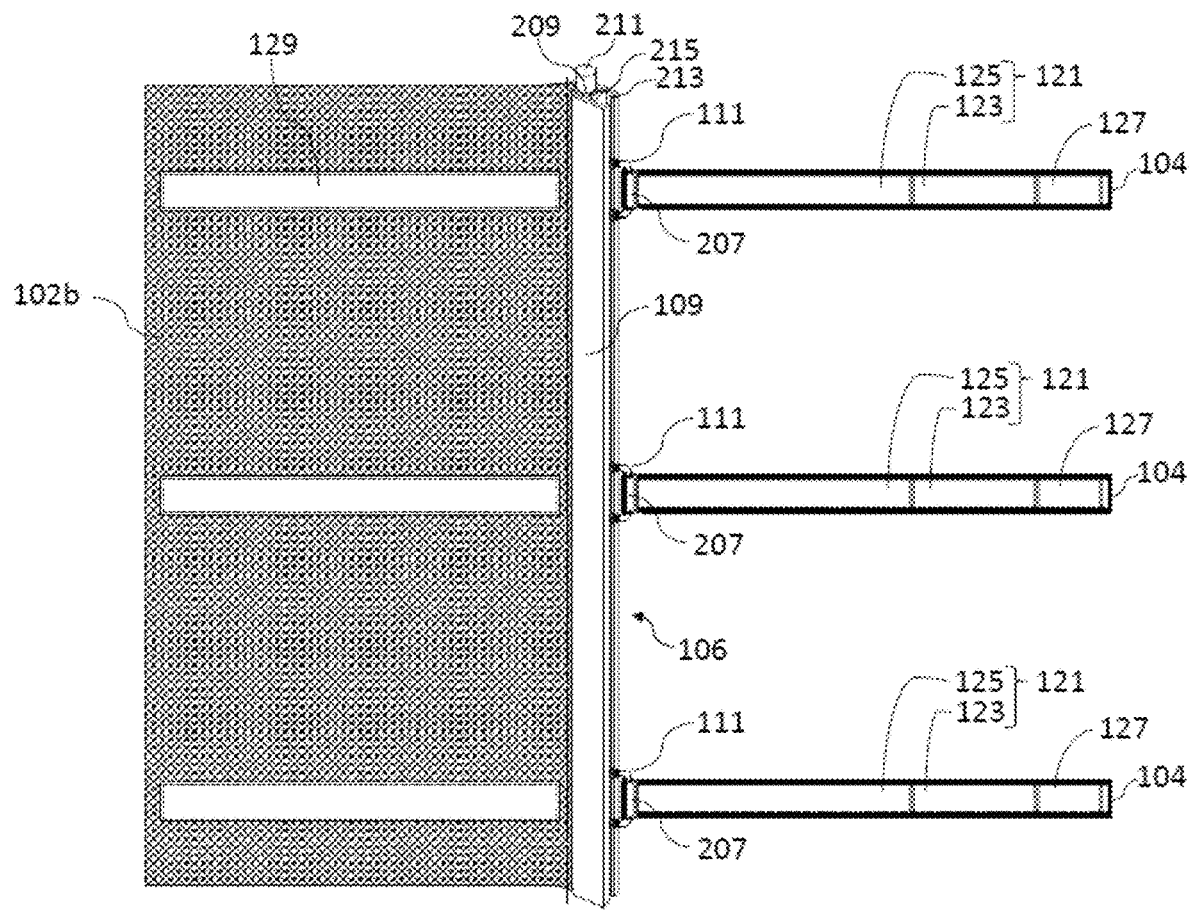
FIG. 2 is a portion of a wrapping device according to embodiments of the present disclosure.

FIG. 2 is a portion of the wrapping device 100 according to embodiments of the present disclosure. The straps 104 are attached to the wrap body 102 through the fastening device 109 and a plurality of U-shaped hooks 111. The U-shaped hooks 111 are removably connected to the fastening device 109 in a manner to be discussed in FIG. 3. The U-shaped hooks 111 are positioned at a predetermined interval on the first side 106 of the wrap body 102. In one aspect, 3 (three) U-shaped hooks 111 are equally arranged along the length of the first side 106.

Each of the straps 104 may have a width of about 1-3 inches and a length of about 6-15 inches. The loop part 125 of the hook-and-loop type fastener 121 is disposed between the hook part 123 and the U-shaped hooks 111. The ratio of the length of the hook part 123 to the length of the loop part 125 may be in a range of about 1:1.5 to about 1:5, for example about 1:3. The ratio of the length of the straps 104 to the length of the wrap body 102 may be in a range of about 1:2 to about 1:6, for example about 1:3. These ratios may vary depending upon the size of the wrap body 102 and the goods and/or the pallet.

A loop 207 is disposed at one end of each strap 104, away from the hook-and-look type fastener 121. The loop 207 is sized to allow passage of the U-shaped hook 111. The U-shaped hooks 111 (having the straps 104 attached thereto) can be connected to the fastening device 109 by sliding the U-shaped hooks 111 into a slot 213 of the fastening device 109. The slot 213 has a profile to allow vertical movement of the U-shaped hooks 111, with a minimum amount of lateral or side-to-side movement of the fastening device 109.

The wrap body 102 has a sleeve 209 disposed at the first side 106 of the wrap body 102. The sleeve 209 extends along the first side 106 and is sized to receive a rod 211, which has a height generally corresponding to the width of the wrap body 102. The rod 211 can be connected to the fastening device 109 by sliding the rod 211 into a slot 215 of the fastening device 109. The slot 215 has a profile to allow vertical movement of the rod 211, with a minimum amount of lateral or side-to-side movement of the fastening device 109. The top and bottom of the fastening device 109 can be covered with a cap 180 (see FIGS. 1A and 1B). The cap 180 is removably attached to the fastening device 109 to secure the rod 211 within the slot 215 while preventing the sharp edge of the fastening device 109 from injuring the operator.

Figure 3:
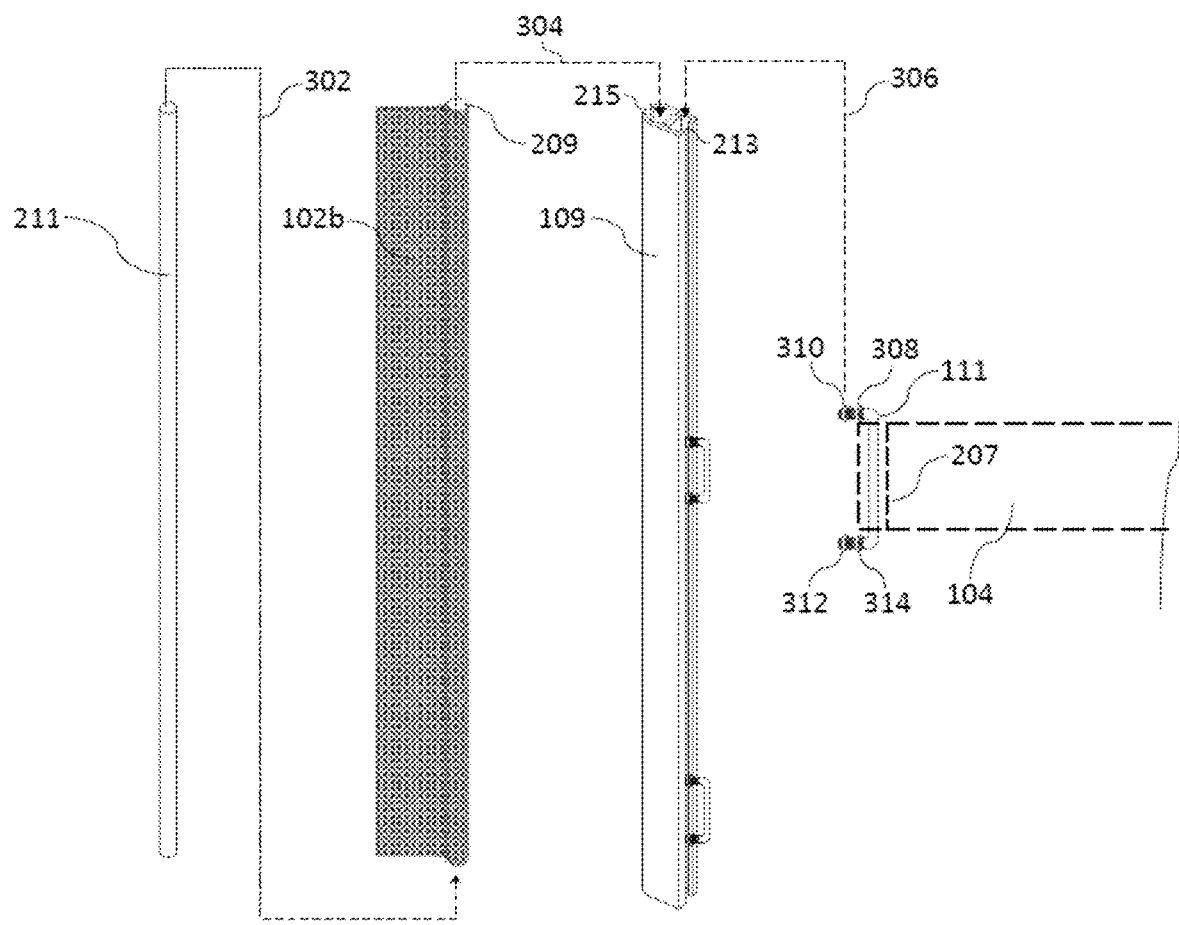
FIG. 3 is an operation of a fastening device with respect to the wrap body according to embodiments of the present disclosure.

FIG. 3 is an operation of the fastening device 109 with respect to the wrap body 102 according to embodiments of the present disclosure. The rod 211 can be inserted into the sleeve 209 along a path 302 from either top or bottom side of the wrap body 102. Once the rod 211 is fully inserted, the sleeve 209 (having the rod 211 disposed therein) is slid into the slot 215 along a path 304, either from the top or bottom side of the fastening device 109.

Similarly, the U-shaped hooks 111 are slid into the slot 213 along a path 306 from either top or bottom side of the wrap body 102. The U-shaped hooks 111 may be secured to the fastening device 109 by rotating the adjustment fasteners 308, 310, 312, 314. The use of the rod 211 and the U-shaped hooks 111 allows the wrap body 102 to be securely connected with the straps 104. The design of the fastening device 109 also permits the straps 104 and the wrap body 102 to be easily removed when needed.

Figure 4A:
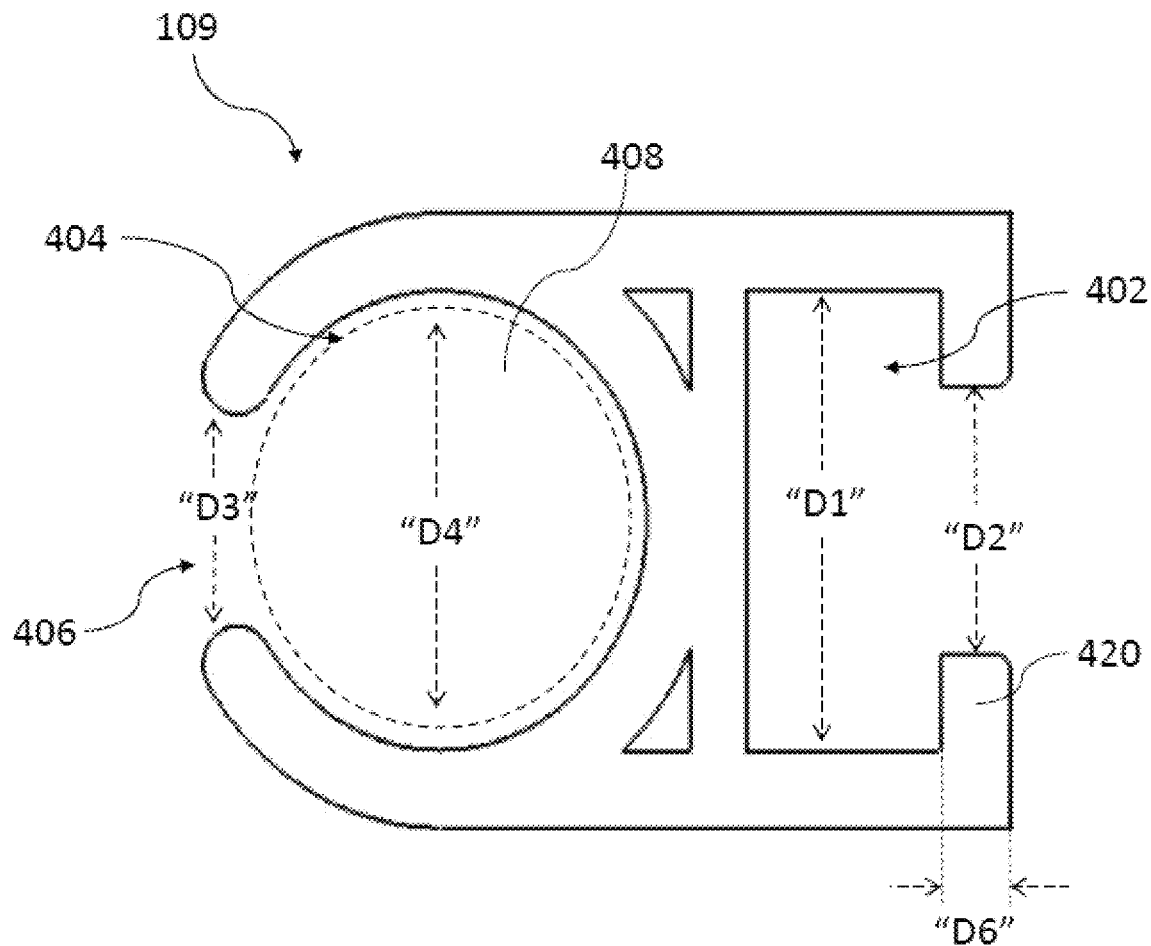
FIG. 4A is a top view of a fastening device according to embodiments of the present disclosure.

FIG. 4A is a top view of the fastening device 109 according to embodiments of the present disclosure. The fastening device 109 has a T-shaped slot 402 on one side of the fastening device 109 and a C-shaped slot 404 on an opposing side of the fastening device 109. The T-shaped slot 402 is sized to confine lateral movement of the U-shaped hook 111 within the T-shaped slot 402. The T-shaped slot 402 has a first dimension "D1" and a second dimension "D2" that is smaller than the first dimension "D1".

The C-shaped slot 404 is sized to receive the wrap body (not shown) that has been sleeved on a rod 408, such as the rod 211 shown in FIGS. 2 and 3. The opening 406 of the C-shaped slot 404 has a diameter "D3". The diameter "D3" is smaller than the diameter "D4" of the rod 408 to confine lateral movement of the rod 408 within the C-shaped slot 404. While T-shaped slot 402 and C-shaped slot 404 are discussed, it is contemplated that slots may have other profile so long as the U-shaped hooks and the rods are retained within the slots without unwanted movement during operation.

Figure 4B:
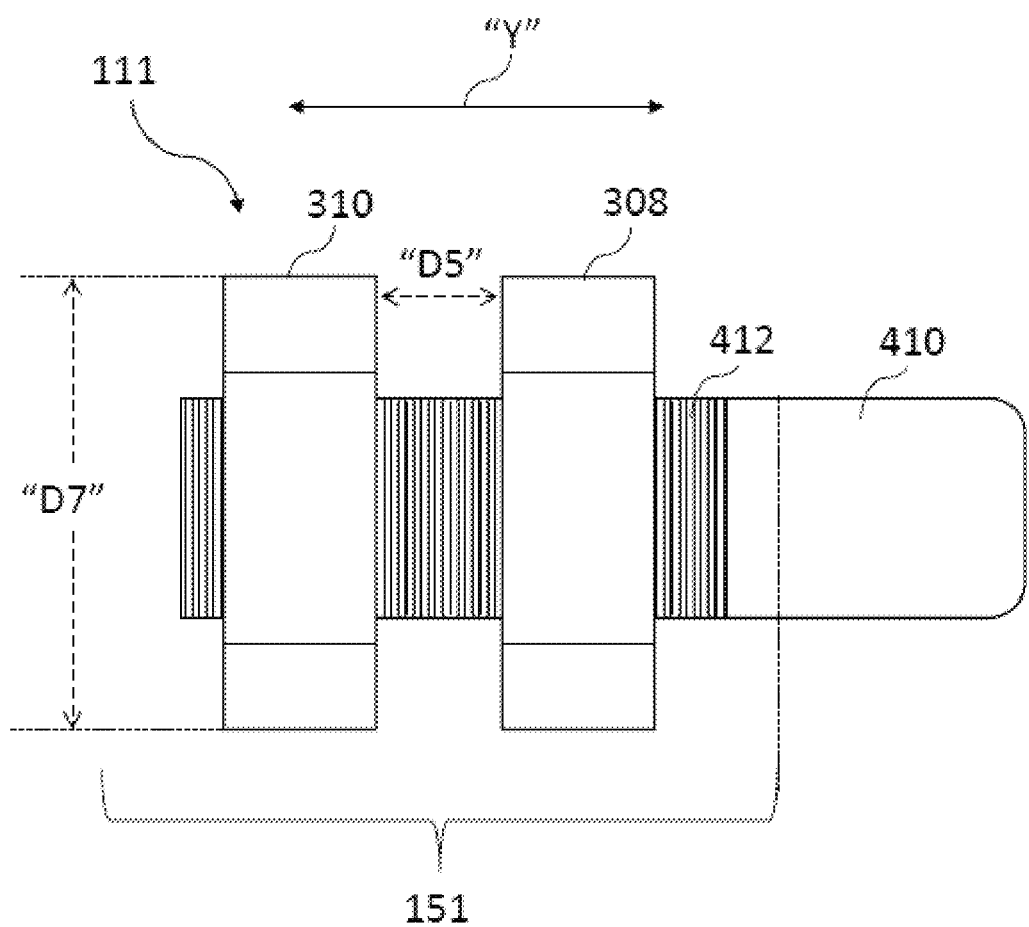
FIG. 4B is a top view of a U-shaped hook according to embodiments of the present disclosure.

FIG. 4B is a top view of the U-shaped hook 111 according to embodiments of the present disclosure. The distal ends 151, 153 of the U-shaped hook 111 have a shank portion 410 and a thread portion 412 extending from one end of the shank portion 406. The adjustment fasteners 308, 310, 312, 314 (only 308, 310 can be seen from the top view) may be a hexagonal nut that has internal threads matching the threads on the thread portion 408. The adjustment fasteners 308, 310 are rotated along the direction "Y" to engage with the thread portion 408. The adjustment fastener 310 has a diameter "D5" greater than the second dimension "D2" of the T-shaped slot 402. The adjustment fastener 310 serves to prevent the U-shaped hook 111 from unwanted lateral movement within the T-shaped slot 402.

In operation, an operator adjusts either the adjustment fastener 308 or the adjustment fastener 310 to obtain a proper distance "D5" between the adjustment fasteners 308, 310. The distance "D5" is larger than the thickness "D6" of the sidewall 420 of the fastening device 109 so that the adjustment fastener 310 can be slid into the T-shaped slot 402. Once a desired height is determined, the operator rotates the adjustment fastener 308 against the sidewall 420 until it is in physical contact with both adjustment fasteners 308, 310. In this way, the U-shaped hook 111 can be secured onto the fastening device 109 at any desired location along the T-shaped slot 402.

Figure 4C:
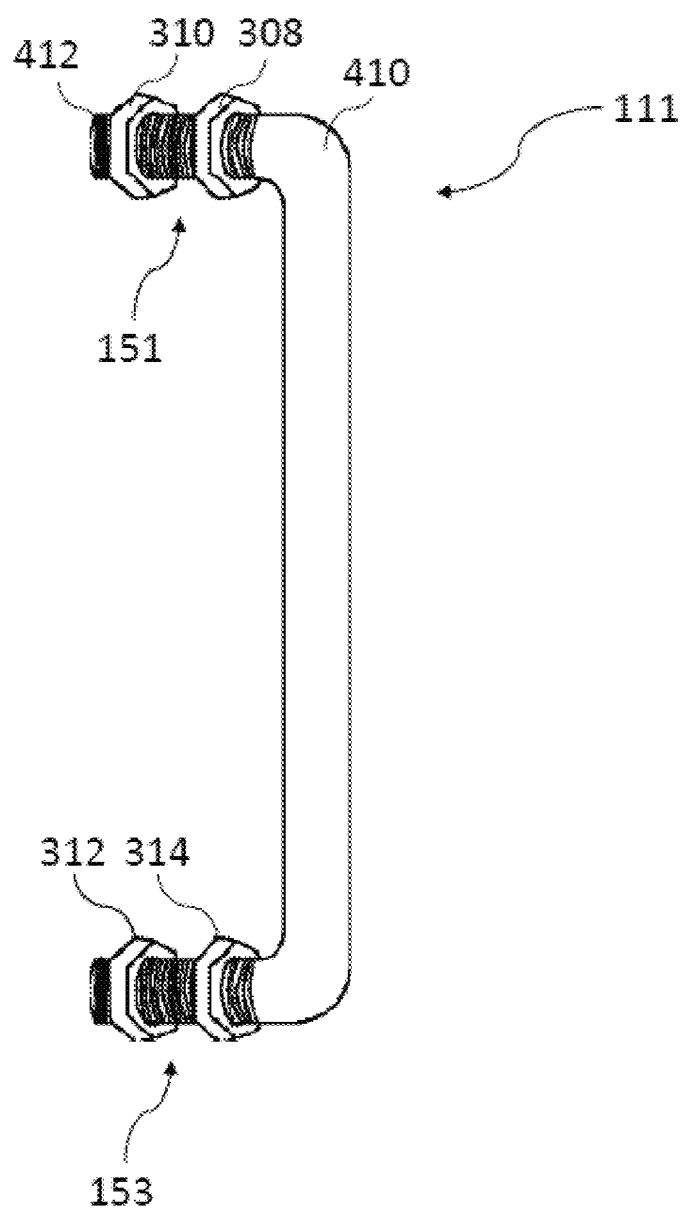
FIG. 4C is a perspective view of a U-shaped hook of FIG. 4B.

FIG. 4C is a perspective view of the U-shaped hook 111. While the hook is shown as a U-shape, any suitable shape such as C-shape or the like may also be used.

Figure 5:
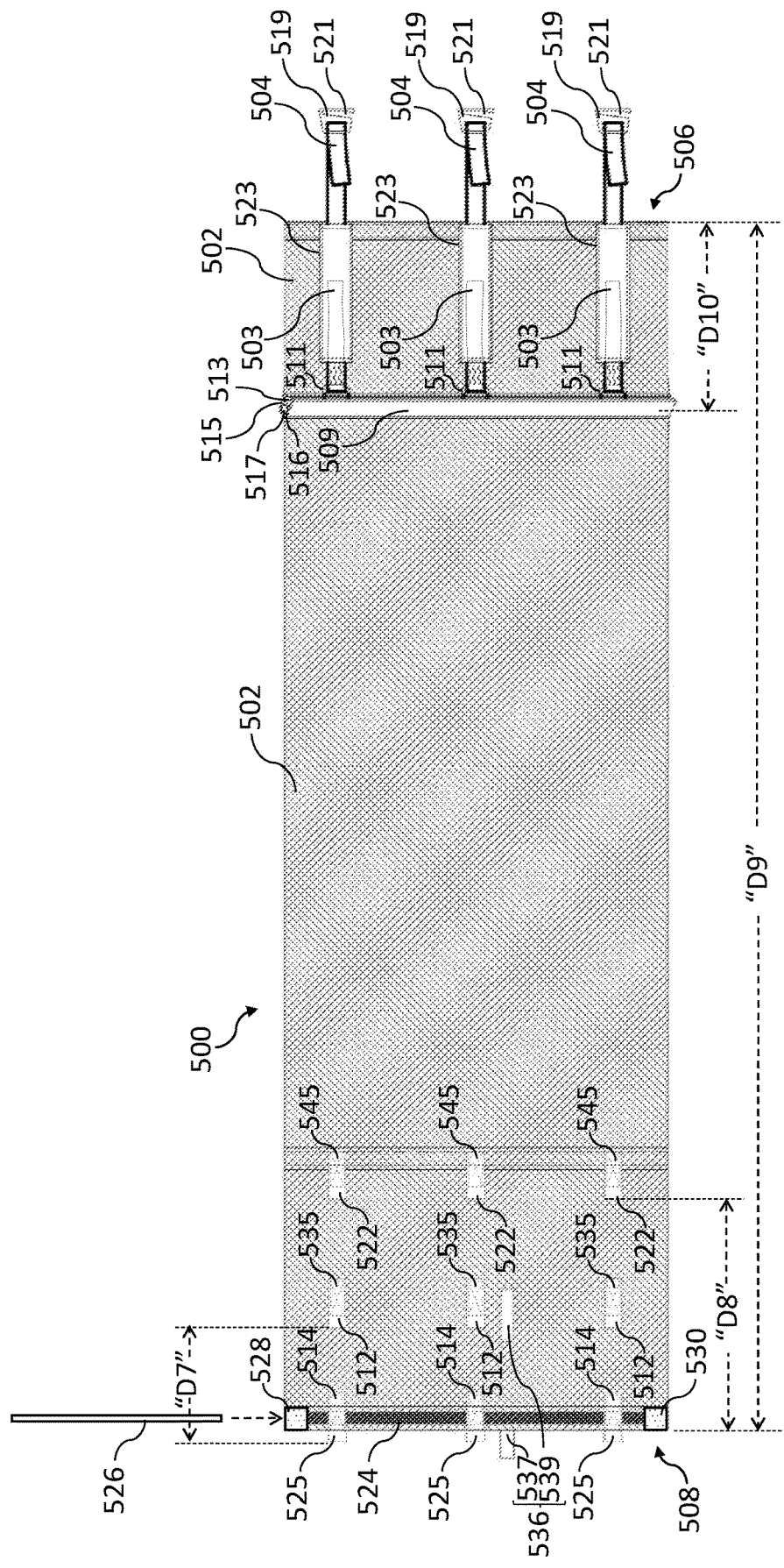
FIG. 5 is perspective view of a wrapping device according to another embodiment of the present disclosure.

FIG. 5 is perspective view of a wrapping device 500 according to another embodiment of the present disclosure. The wrapping device 500 generally includes a wrap body 502 and a plurality of straps 504. The straps 504 are attached to a first side 506 of the wrap body 502. Like the wrap body 202 shown in FIG. 1, the wrap body 502 is generally rectangular in shape and sized to circumvent or encircle the goods on a transportation carrier, such as a pallet. The wrap body 502 may be fabricated from a lightweight, abrasion-resistant material such as those used for the wrap body 202. In one embodiment, the wrap body 502 is made of a mesh fabric having net-like appearance. The wrap body 502 may be coated with vinyl to enhance durability of the wrapping device 500.

The straps 504 may be a strip of cloth, leather or any suitable flexible material such as those discussed above with respect to the straps 104. The straps 504 may extend through the respective covers 523 that are sewed, stitched, or otherwise secured to the wrap body 502. The covers 523 span laterally from a region near the fastening device 509 to the edge (e.g., first side 506) of the wrap body 502. The covers 523 can confine movement of the straps 504 and thus maintain a proper distance between straps 504.

In some embodiments, the straps 504 may further include an elastic portion 503 that is part of, or attached onto, the straps 504 to help confine stretching or lateral extension of the straps 504 and provide cushioning for the pallet and loaded goods during transportation. An exemplary application of the elastic portion 503 can be found in FIG. 6 and its discussion related to the first portion 603. The elastic portion 503 may be a stretch fabric, a woven elastic, or a synthetic plastic material having a high degree of elastic yieldability. Suitable material may include, but is not limited to stretched or unstretched cotton, polyester, polyamide polyester or polypropylene. The term "elastic" as used in this disclosure refers to any material that upon application of a force, can stretch to an elongated length of at least 30%-200% (e.g., 100%-180%) of its relaxed, original length, without breaking, and upon release of the applied force, recovers substantially to its original length.

The straps 504 are attached to the wrap body 502 through a fastening device 509 and a plurality of U-shaped hooks 511. The fastening device 509 and the U-shaped hooks 511 function similarly to the fastening device 109 and the U-shaped hooks 111, as discussed above with respect to FIGS. 3 and 4A-4B. Specifically, the U-shaped hooks 511 can removably connect to the fastening device 509 by sliding into a T-shaped slot 513. The fastening device 509 also has a C-shaped slot 515 sized to allow passage of a rod 517, upon which a portion of the wrap body 502 is sleeved on, thereby connecting the wrap body 502 to the fastening device 509.

The rod 517 is received within a pocket 516 that is disposed along the first side 506 of the wrap body 502. The pocket 516 may be located at a distance "D10" from the edge of the first side 506.

The straps 504 can include a hook 519 that is attached or otherwise secured to the straps 504. Each of the hooks 519 has a slot 521 for being received or engaged in corresponding loops 525 attached on a second side 508 of the wrap body 502. The loops 525 are arranged along the second side 508 at locations corresponding to that of the U-shaped hooks 511. The loops 525 are attached to, or part of patches 514 that can be sewn, stitched, or otherwise secured to the wrap body 502. In some embodiments, two or more rows of patches 535, 545 and loops 512, 522 are further provided to the wrap body 502. The hooks 519 may secure to either row of the loops 512, 522, 525 for adjustment in tightness for the wrap body 502 with respect to the goods and the pallet.

The patches 535, 545 may maintain a distance "D7" and "D8" to the patches 514. The distance "D7" is measured from the loops 525 to the loops 512 and the distance "D8" is measured from the loops 525 to the loops 522. The wrap body 502 may have a diameter "D9" of about 120 inches to about 250 inches, for example about 140 inches to about 180 inches. The ratio of the distance "D7" to the distance "D8" may be about 1:2. The ratio of the distance "D7" to the diameter "D9" may be about 1:10 to about 1:20, for example about 1:14. The fastening device 509 may be located at a distance "D10" measuring from the edge of the first side 506. The ratio of the distance "D10" to the diameter "D9" of the wrap body 502 may be about 1:10 to about 1:20, for example about 1:14. It is contemplated that these ratios may vary depending upon the application.

A pocket 524 is attached at the second side 508 of the wrap body 502. The pocket 524 may be sewn, stitched, or otherwise secured to the wrap body 502. The pocket 524 extends along the second side 508 and is sized to receive a rod 526, which may have a height corresponding to that of the pocket 524. The rod 526 may be formed of aluminum alloy or any suitable lightweight, high-strength material. The rod 526 can be fully inserted into the pocket 524 through an opening located at an upper or bottom end of the pocket 524. The fastening device 509 and the rod 526 together provide rigidity or structure for the wrap body 502.

The rod 526 may be retained permanently within the pocket 524 by sealing the top and bottom of the pocket 524 with a tab 528, 530, respectively. Such tabs 528, 530 may be sewn, stitched, or otherwise secured to the wrap body 502. Alternatively, the tabs 128, 130 may be removably attached to the top and bottom of the pocket 524 via the use of hook-and-loop type fasteners or any suitable means such as zippers, clips, buttons, tapes, or the like, thereby allowing the rod 526 to be removed from the wrap body 502 as needed. The pocket 524 and the tabs 528, 530 may be made of flat nylon webbing or other suitable material, such as those used for the wrap body 102. The patches 514 can be disposed on or over the pocket 524 to enhance durability of the pocket 524 and secure the rod 526 to the wrap body 502.

Optionally, a hook-and-loop type fastener 536 may be provided to the wrap body 502. The hook-and-loop type fastener 536 can secure packaging/folding of the wrapping device 500 when not in use. The hook part 537 of the hook-and-loop type fastener 536 may be sewn, stitched, or otherwise secured to the second side 508 of the wrap body 502, for example at the edge of the wrap body 502 adjacent to the patch 514. The loop part 539 of the hook-and-loop type fastener 536 may be sewn, stitched, or otherwise secured at a region adjacent to the patch 535. The hook part 537 and the loop part 539 are arranged at about the same height on the wrap body 502 and can be interchanged with one another. If desired, the loop part 539 can have a length greater than that of the hook part 537 to allow easy adjustment of tightness when folding or rolling the wrap body 502.

Figure 6:
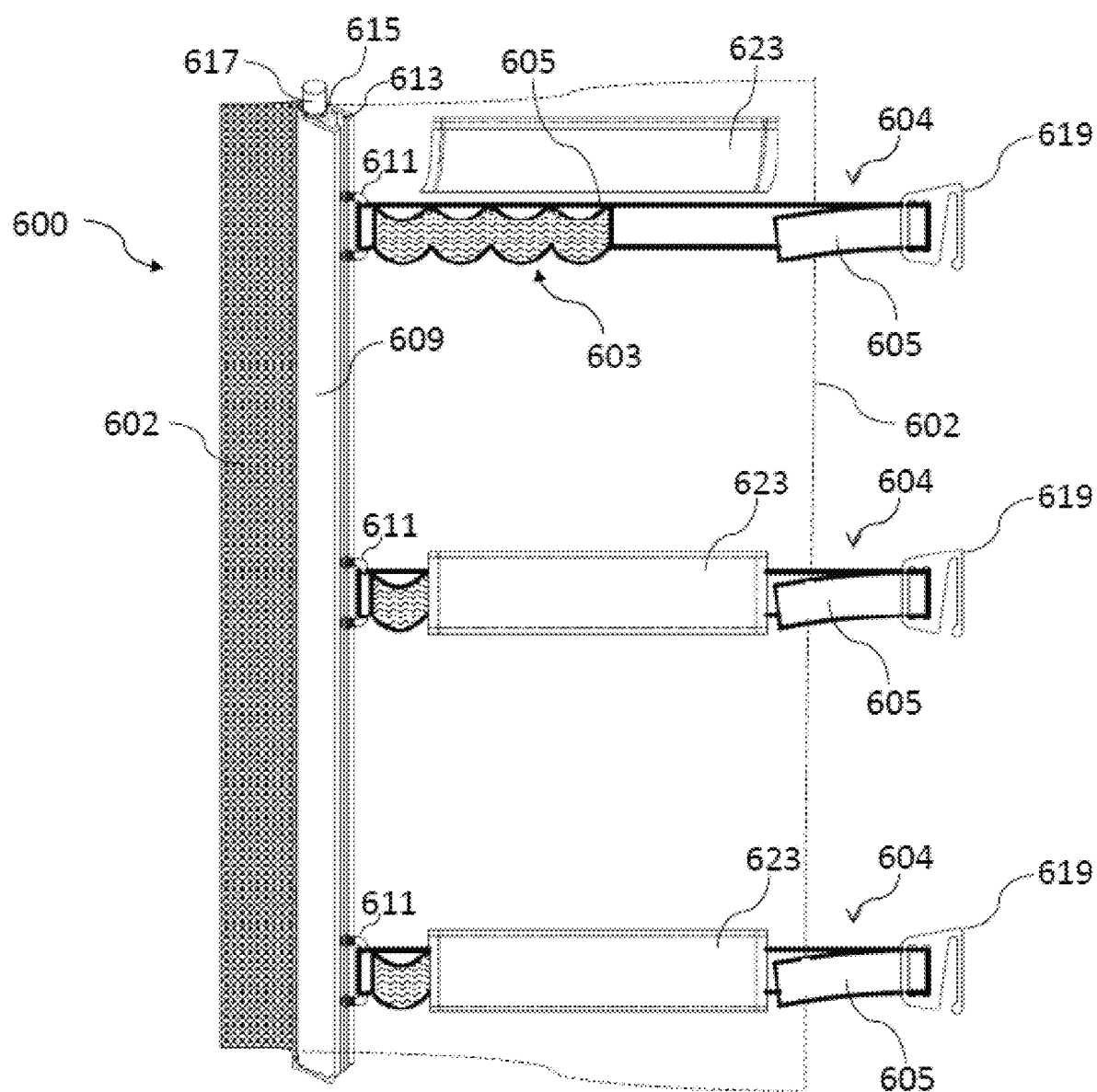
FIG. 6 is a perspective view of a portion of the wrapping device according to embodiments of the present disclosure.

FIG. 6 is a perspective view of a portion of the wrapping device 600 according to embodiments of the present disclosure. The wrapping device 600 is substantially identical to the wrapping device 500 except that a pocket 623, such as the pocket 523 shown in FIG. 5, is being moved away from the wrap body 602 (represented by dotted lines) to reveal a portion of the straps 604. Each strap 604 generally includes a first portion 603 and a second portion 605 disposed under the first portion 603. The first portion 603 may be sewn, stitched, or otherwise secured to the second portion 605. The first portion 603 may be formed from the same material as the elastic portion 503 discussed above. In one embodiment, the first portion 603 is a stretchable, woven elastic spanning over a portion of the second portion 605 along the longitudinal direction of the strap 604.

Both ends of the first portion 603 can be secured to the second portion 605. In one aspect, the first end of the first portion 603 is adjacent to the U-shaped hooks 111, and the second end of the first portion 603 is terminated at any location covered by the pocket 623. The first portion 603 functions similarly to the elastic portion 503 to provide elasticity for the straps 604. The first portion 603 also provides cushioning for the pallet and the loaded goods during transportation. While not shown, pockets 623 may be sewn, stitched, or otherwise secured to the wrap body 602 in a similar fashion as discussed above with respect to the pocket 523. The pockets 623 are provided to protect the first portion 603 and confine movement of the first portion 603 during transportation.

The first portion 603 has an original length "L0" when it is in a relax, non-stretched state. The first portion 603 can stretch along its longitudinal direction to a first elongated length "L1" of at least about 100%-180% of its relaxed, original length. The first elongated length "L1" is greater than the original length "L0". In various embodiments, the first portion 603 is stitched, sewn, or secured to the second portion 605 while stretched to a second elongated length "L2" of at least about 50%, for example about 60% to about 90%, of its relaxed, original length. The second elongated length "L2" is greater than the original length "L0" but less than the first elongated length "L1".

Having the first portion 603 stitched or otherwise secured to the second portion 605 in its stretched state (e.g., at elongated length "L2") prevents the elastic material of the straps 604 from excessive deformation of elastic fatigue or breakage, while allowing the pallet and the loaded goods to be securely packed during transportation when wrapped around by the stretched straps 604.

Likewise, the first end of the straps 604 is attached to a hook 619. The hook 619 is configured so that the second portion 605 of the strap 604 can be removably secured in position by friction on the hook 619. The second end of the straps 604 can attach to the respective U-shaped hooks 611 and connect to the fastening device 609 by sliding the U-shaped hooks 611 into a T-shaped slot 613. A portion of the wrap body 602 can sleeve onto a rod 617 and slide into a C-shaped slot 615. Once the wrap body 602 is secured to the straps 604, the straps 604 along with the wrap body 602 may encircle the pallet and loaded goods and engage with the corresponding loops (not shown, such as the loops 525, 535, 545) located on the wrap body 602, thereby securing the loaded goods in place.

Figure 7:
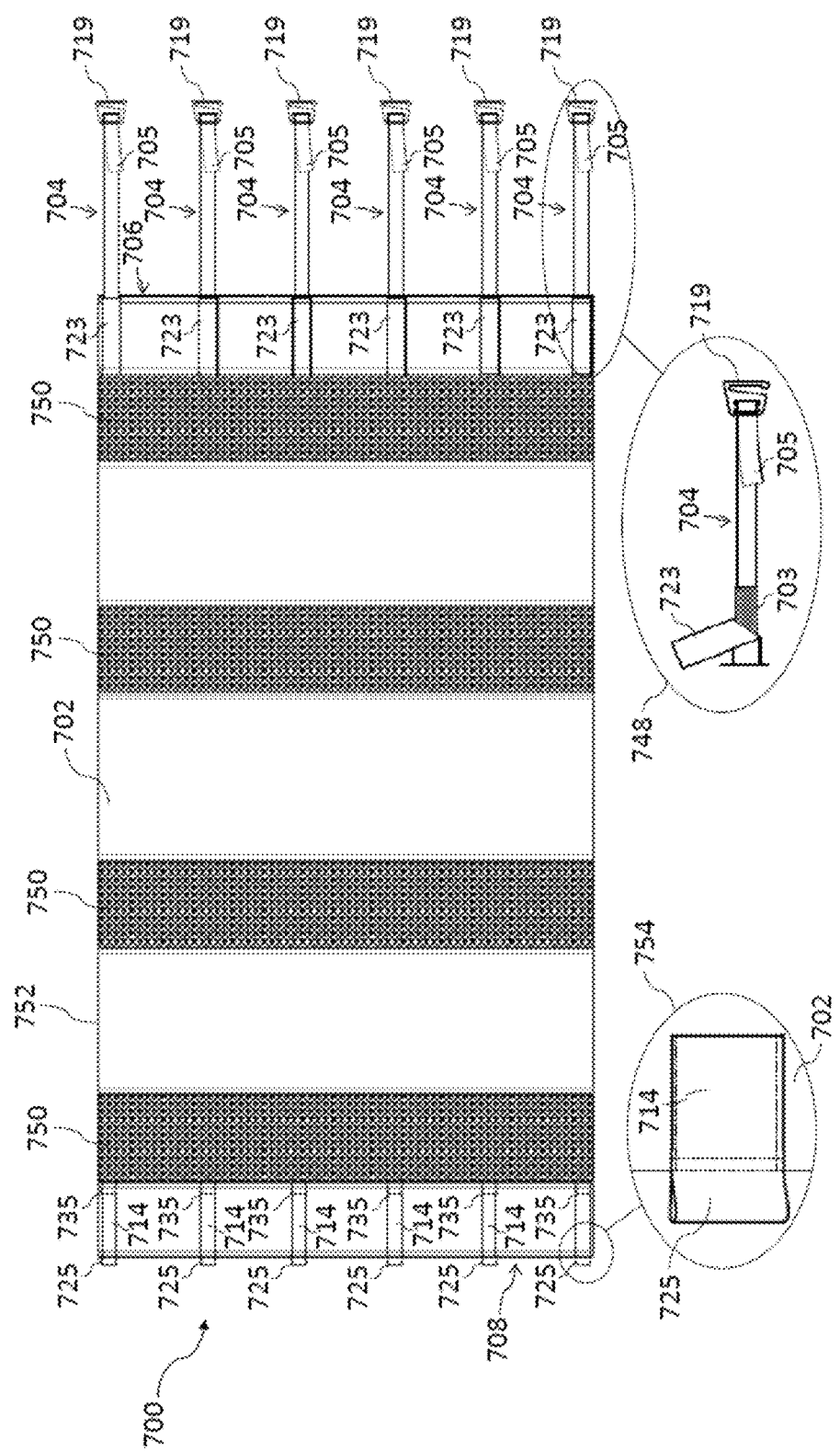
FIG. 7 is a perspective view of a wrapping device according to embodiments of the present disclosure.

FIG. 7 is a perspective view of a wrapping device 700 according to embodiments of the present disclosure. The wrapping device 700 generally includes a wrap body 702 and a plurality of straps 704. The straps 704 are attached to a first side 706 of the wrap body 702. The wrap body 702 is rectangular in shape and sized to circumvent or encircle the goods on a transportation carrier, such as a pallet. The wrap body 702 may be fabricated from a lightweight, abrasion-resistant material, such as those used for the wrap body 502.

Unlike the wrapping device 500, the wrapping device 700 does not require a fastening device (e.g., the fastening device 509), U-shaped hooks (e.g., the U-shaped hooks 511), a rod (e.g., the rod 526), and components associated therewith (e.g., pocket 524, patches 514, 535, 545 etc.) In this embodiment, which can be combined with any of the embodiments described in this disclosure, the wrapping device 700 has a plurality of elastic sections 750 arranged vertically from the top 752 to the bottom 754. The elastic sections 750 may be intermittently disposed along the longitudinal direction of the wrap body 702. In one aspect, the elastic sections 750 is equally spaced along the longitudinal direction of the wrap body 702. The wrap body 702 can have any desired number of the elastic sections 750. In one embodiment, four (4) elastic sections 750 are provided to the wrap body 702. Greater or less elastic sections 750 are contemplated, depending on the size of the wrap body 702 or the application.

The elastic sections 750 are sewn, stitched, or otherwise secured to the wrap body 702. The elastic sections 750 may be formed of any suitable flexible material such as polyester, nylon, polypropylene, polyethylene, canvas, composite woven, any suitable natural or synthetic materials, or any combination thereof. The elastic sections 750 have an original length "L3" when it is in a relax, non-stretched state. The elastic section 750 can stretch along its longitudinal direction to an elongated length "L4" of at least about 10% to about 150% (e.g., 50% to about 120%) of its relaxed, original length. The elongated length "L4" is greater than the original length "L3". The use of the elastic sections 750 provides extra elasticity to the wrap body 702, which in turn allows the wrapping device 700 to handle more loads when needed.

The wrap body 702 can have any desired number of the straps 704. In one embodiment, six (6) straps 704 are provided to the wrap body 702. Greater or less straps 704 are contemplated, depending on the size of the wrap body 702 or the application. The straps 704 may be a strip of cloth, leather or any suitable flexible material, such as those discussed above with respect to the straps 504. The straps 704 may extend through the respective covers 723 that are sewed, stitched, or otherwise secured to the wrap body 702. The covers 723 may span laterally from the edge (e.g., first side 706) of the wrap body 702 to the elastic section 750 located at the far right of the wrap body 702. The covers 723 confine movement of the straps 704 and help maintain a proper distance between straps 704.

As shown in the detailed view 748, the straps 704 can further include an elastic portion 703 that is part of, or attached onto, the straps 704 to help confine stretching or lateral extension of the straps 504. The elastic portion 703 may be fabricated in the same or similar fashion to the first portion 603 discussed above with respect to FIG. 6. Likewise, the elastic portion 703 has an original length "L5" when it is in a relax, non-stretched state. The elastic portion 703 can stretch along its longitudinal direction to a first elongated length "L6" of at least about 100%-180% of its relaxed, original length. The first elongated length "L6" is greater than the original length "L5". In various embodiments, the elastic portion 703 is stitched, sewn, or secured to the straps 704 while stretched to a second elongated length "L7" of at least about 50%, for example about 60% to about 90%, of its relaxed, original length. The second elongated length "L7" is greater than the original length "L5" but less than the first elongated length "L6".

Likewise, the elastic portion 703 is stitched or otherwise secured to the straps 704 in its stretched state (e.g., at the second elongated length "L7") prevents the elastic material of the straps 704 from excessive deformation of elastic fatigue or breakage, while allowing the pallet and loaded goods to be securely packed during transportation when wrapped around by the stretched straps 704.

The first end of the straps 704 is attached to a hook 719. The hook 719 is configured similarly to the hook 619 to engage with the corresponding loops 725 located on a second side 708 of the wrap body 702. The loops 725 may be part of a patch 714 that are sewn, stitched or otherwise secured to the wrap body 702, as shown in the enlarged view 754. In some embodiments, a second row of loops 735 are further provided to the wrap body 702. The hooks 719 may secure to either row of the loops 725, 735. It is contemplated that additional loops can be provided to the wrap body 702 in a similar fashion for adjustment in tightness for the wrap body 702 with respect to the goods and the pallet.

Figure 8:
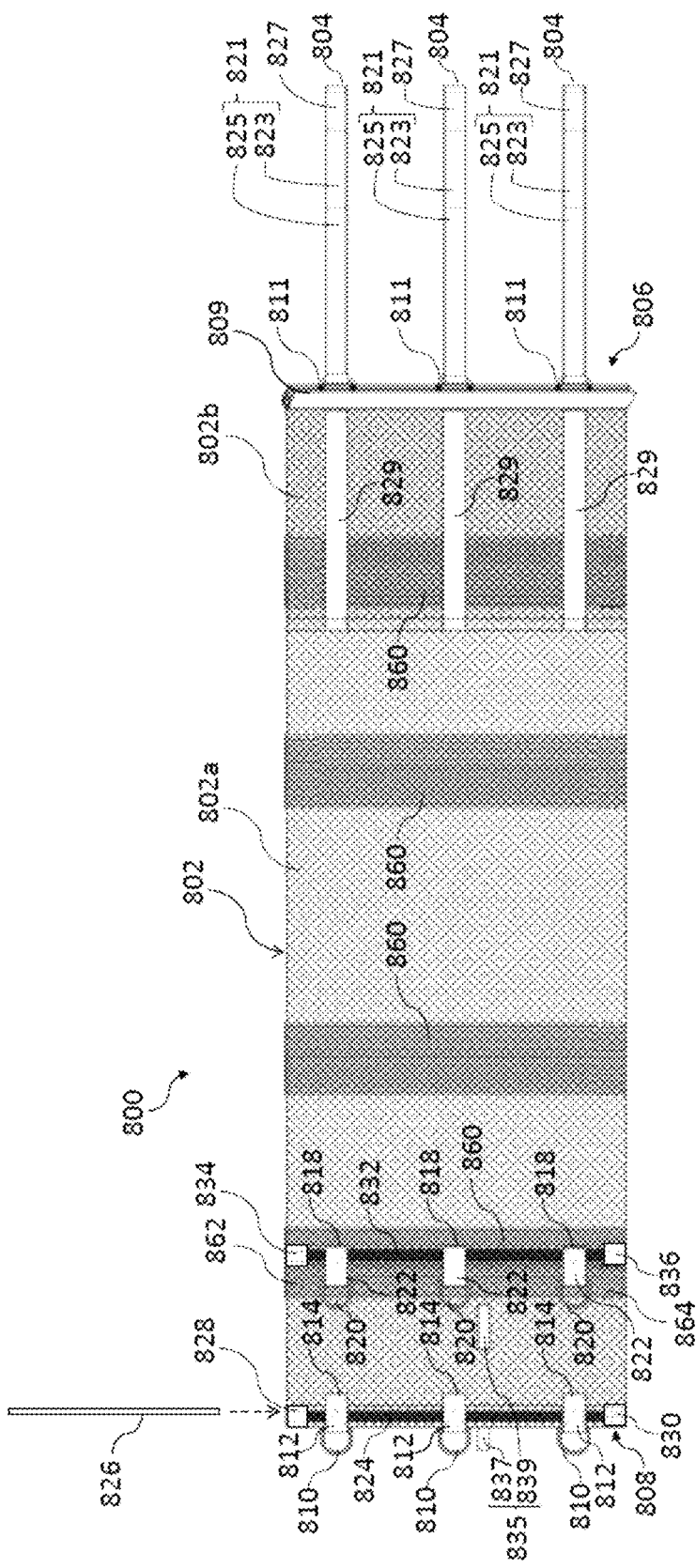
FIG. 8 is a perspective view of a wrapping device according to embodiments of the present disclosure.

FIG. 8 is a perspective view of a wrapping device 800 according to embodiments of the present disclosure. The wrapping device 800 is substantially similar in design to the wrapping device 100 discussed above with respect to FIG. 1 except that two or more protectors 860 are further provided to the wrap body 802 to protect corners of the loaded goods on the pallet.

The wrapping device 800 includes a wrap body 802 having a first side 806 and a second side 808 opposing the first side 806. The wrap body 802, like the wrap body 102, is generally rectangular in shape and sized to encircle the goods on a transportation carrier. The wrap body 802 includes separate pieces of flexible material that are sewn, stitched, or otherwise secured together, such as the wrap body 802a, 802b. Alternatively, the wrap body 802 can be a solid sheet of plastic that is flexible and transparent. The wrap body 802 may be fabricated from the same material as the wrap body 102. The wrap body 802 may include one or more reinforcing straps 829, similar in design to the reinforcing straps 129, to strengthen the durability of the wrap body 802.

A plurality of straps 804, such as the straps 104, are attached to the first side 806 of the wrap body 802. Each strap 804 includes a hook-and-loop type fastener 821 having a hook part 823 and a loop part 825. Each of the straps 804 further includes a holding part 827 for ease of grasping by a human operator. Like the embodiment shown in FIG. 1, the straps 804 are attached to the wrap body 802 through a plurality of U-shaped hooks 811. The U-shaped hooks 811 are removably connected to a fastening device 809, which is an elongated member configured to engage with the wrap body 802. The fastening device 809, U-shaped hooks 809 and their relationship with respect to the straps 804 and the wrap body 802 are substantially similar to the fastening device 109 and U-shaped hooks 109 and the details can be referred to FIGS. 4A and 4B.

A plurality of patches 814, 818, such as the patches 114, 118, are sewn, stitched, or otherwise secured to the wrap body 802 along the second side 808. The patches 814, 818 each have a loop 812, 822 sized to receive a connection ring 810, 820, respectively. The hook-and-loop type fastener 821 work with the connection rings 810, 820 to secure the wrap body 102 around the goods and the pallet.

A pocket 824, such as the pocket 124, is provided at the second side 808 of the wrap body 802. The pocket 824 is sized to receive a rod 826 through an opening located at an upper and/or bottom end of the pocket 824. The rod 826 may be retained within the pocket 824 and pocket 832 (if used) in a similar fashion to those discussed above with respect to FIG. 1 by sealing the top and bottom of the pocket 824 with a tab 828, 830, 834, 836, respectively.

Like the hook-and-loop type fastener 135, a hook-and-loop type fastener 835 can be provided to the wrap body 802 in the similar fashion to secure folding of the wrapping device 800 when not in use. The loop part 839 can have a length greater than that of the hook part 837 to allow easy adjustment of tightness when folding or rolling the wrap body 802.

In some embodiments, which can be combined with any of the embodiments described in this disclosure, the protectors 860 are optionally provided onto the wrap body 802 to protect edge or corners of the loaded goods. In one embodiment, the protectors 860 are located on a back side of the wrap body 802. That is, the protectors 860 are provided on a side that opposes the side where the pockets 824, 832 are located. The location of the protectors 860 are shown in FIG. 8 for illustration purposes. Additionally, or alternatively, the protectors 860 may be provided on the same side as the pockets 824, 832. The wrap body 802 can have any desired number of the protectors 860, depending on the size of the wrap body 802, the pallet, and/or the application. In one embodiment, four (4) protectors 860 are provided to the wrap body 802. The protectors 860 are intermittently disposed along the longitudinal direction of the wrap body 802. The distance "D11" between two immediately adjacent protectors 860 may vary depending upon the size of the loaded goods and/or the pallet. In any case, the resulting intermittent segments in which the protectors 860 are present should effectively cover at least the apex of corners of the loaded goods where protection is critical.

FIG. 9A illustrates a perspective view of a portion of the protector 860 according to embodiments of the present disclosure. The protectors 860 have a height generally corresponding to the height of the wrap body 802. The protectors 860 may include a plurality of interchangeable parts 902, each formed of a rigid material. The interchangeable parts 902 may be positioned in parallel and connected together using any suitable means 904, such as wire, adhesive tape, or a material layer such as textile or plastic film, making it a mat-like structure. Suitable material for the protectors 860 may include, but is not limited to, plastic, metal, fiberglass, composites, wood, bamboo, or any material capable of protecting the loaded goods. The arrangement of the interchangeable parts 902 allows the protectors 860 to bend and form any angle according to the corner profile of the loaded goods. FIG. 9B illustrates a perspective view of a portion of the protector 860 being bent to a right-angle to cover a corner of a loaded good (not shown).

Figure 10:
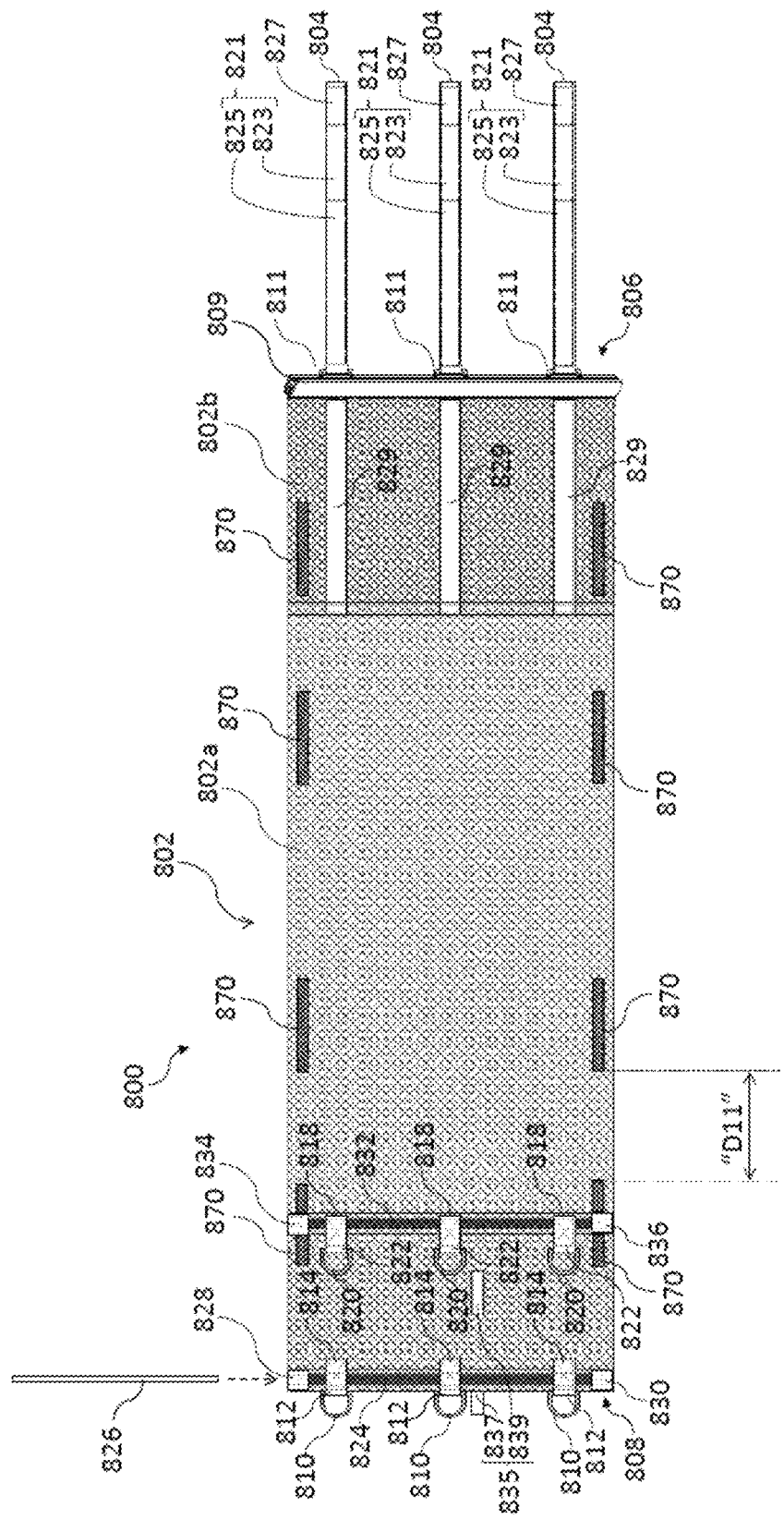
FIG. 10 illustrates a perspective view of a wrapping device prior to installation of the protectors according to embodiments of the present disclosure.

The protectors 860 can be removably attached to the wrap body 802 through a quick-release mechanism, such as, for example, a hook-and-loop fastener, a magnet, a latch, or the like. In cases where a hook-and-loop fastener is used, a loop part may be attached to front and/or back sides of the protectors 860, and a hook part may be attached to the wrap body 802 on the same side as the pocket 824, or vice versa. In the embodiment shown in FIG. 9A, two loop parts 906 are attached to a side of the protectors 860, at regions close to the top and bottom of the protector 860. The loop parts 906 are to be engaged with a corresponding hook part 870 that is sewed, stitched, or otherwise attached to either side of the wrap body 802 at locations according to the arrangement of the protectors 860. FIG. 10 illustrates a perspective view of the wrapping device 800 prior to installation of the protectors 860.

Figure 11:
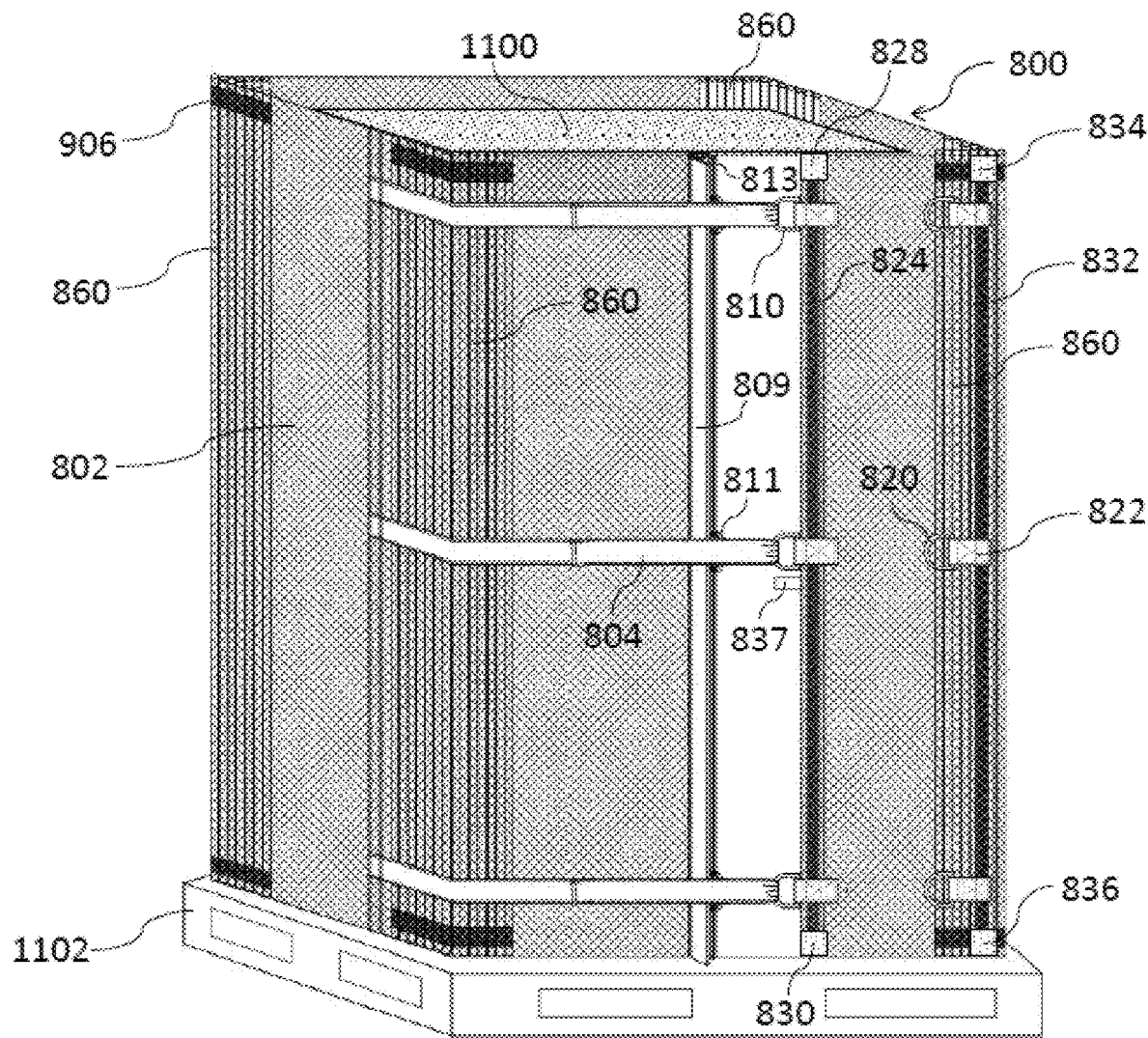
FIG. 11 illustrates a perspective view of a wrapping device encircling loaded goods on a pallet according to embodiments of the present disclosure.

FIG. 11 illustrates a perspective view of the wrapping device 800 encircling loaded goods 1100 on a pallet 1102 according to embodiments of the present disclosure. In operation, an operator may attach protectors 860 onto the wrap body 802. The operator connects U-shaped hooks 811 (having the straps 804 attached thereto) to the fastening device 809 by sliding the U-shaped hooks 811 into a slot 813 of the fastening device 809. The wrap body 802 is then wrapped around the goods 1100 such that a hook-and-loop type fastener (not shown) passes through the connection rings 810 and fold back to secure the wrap body 802 around the goods 1100. Particularly, the corners of the loaded goods 1100 are protected by the protectors 860, which are attached to the back side of the wrap body 802.

Figure 12:
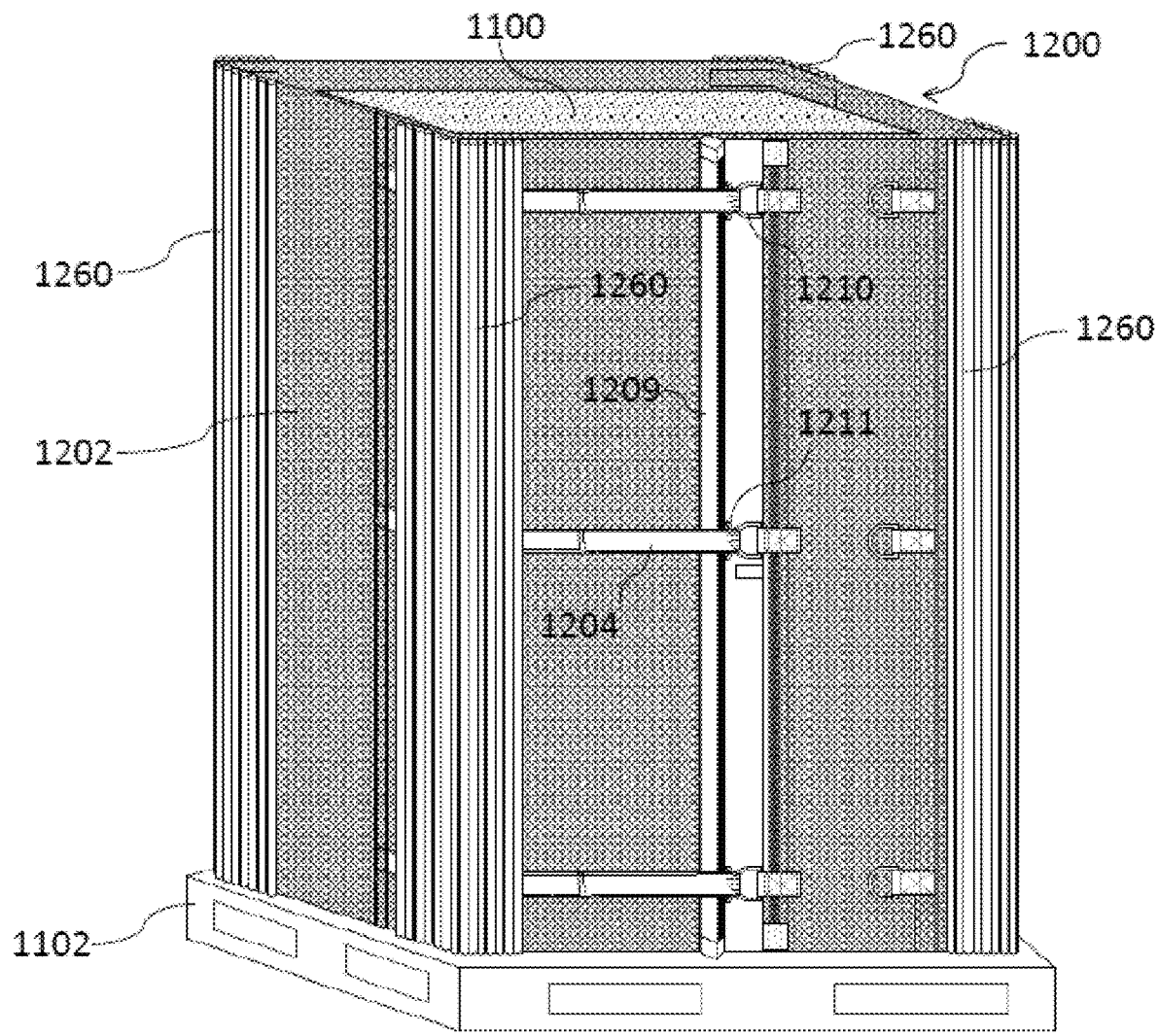
FIG. 12 illustrates a perspective view of a wrapping device encircling loaded goods on a pallet according to embodiments of the present disclosure.

FIG. 12 illustrates a perspective view of the wrapping device 1200 encircling loaded goods 1100 on a pallet 1102 according to embodiments of the present disclosure. The wrapping device 1200 is identical to the wrapping device 800 shown in FIG. 11 except that the protectors 1260 are disposed on the front side of the wrap body. In operation, an operator may attach protectors 1260 onto the wrap body 1202. The operator connects U-shaped hooks 1211 (having the straps 1204 attached thereto) to the fastening device 1209 by sliding the U-shaped hooks 1211 into a slot of the fastening device 1209. The wrap body 1202 is then wrapped around the goods 1100 such that a hook-and-loop type fastener (not shown) passes through the connection rings 1210 and fold back to secure the wrap body 1202 around the goods 1100. Particularly, the corners of the loaded goods 1100 are protected by the protectors 1260, which are attached to the front side of the wrap body 1202.

Embodiments of the present disclosure provide a reusable wrapping device for securing loaded goods on a transportation carrier, such as a pallet. The improved wrapping device allows an operator to secure the loaded goods on the pallet with a wrap body that can be removably connected to an elongated fastening device, to which elastic straps are also removably attached, for easy adjustment of tightness of the wrap body with respect to the pallet and the loaded goods. The wrap body also includes rigid protectors that can be removably attach to either side of the wrap body to protect the corners of the loaded goods during the transportation.

While the foregoing is directed to implementations of the present disclosure, other and further implementation of the disclosure may be devised without departing from the basic scope thereof, and the scope thereof is determined by the claims that follow.

The invention claimed is:

1. A wrapping device for securing goods on a transportation carrier, the wrapping device comprising:
   a flexible wrap body having a first side and a second side opposing the first side;
   a fastening device removably connected to the flexible wrap body, the fastening device being disposed along the first side of the flexible wrap body;
   a plurality of straps removably attached to the fastening device; and
   a plurality of connection rings provided along the second side of the flexible wrap body, wherein each connection ring is sized to allow the respective strap to pass through.

2. The wrapping device of claim 1, further comprising:
   a plurality of U-shaped hooks removably attached to the fastening device, and the plurality of U-shaped hooks is provided at locations corresponding to the plurality of connection rings.

3. The wrapping device of claim 2, wherein the fastening device has a first slot configured to receive the plurality of U-shaped hooks.

4. The wrapping device of claim 2, further comprising:
   a first pocket extended along the second side of the flexible wrap body, wherein the first pocket is sized to receive a first rod.

5. The wrapping device of claim 4, wherein the flexible wrap body has a second pocket extended along the first side, and the second pocket is sized to receive a second rod.

6. The wrapping device of claim 5, wherein the fastening device has a second slot configured to receive the second rod.

7. The wrapping device of claim 2, wherein each of the plurality of straps has a loop disposed at a first end of the strap, and each loop is sized to allow one of the plurality of the U-shaped hooks to pass through.

8. The wrapping device of claim 1, wherein each of the plurality of straps has a hook-and-loop fastener disposed at a second end of the strap.

9. A wrapping device, comprising:
   a flexible wrap body having a first side and a second side opposing the first side;
   a fastening device removably connected to the flexible wrap body, the fastening device being disposed along the first side of the flexible wrap body, and the fastening device having a first slot and a second slot opposing the first slot;
   a plurality of U-shaped hooks removably engaged with the first slot; and
   a plurality of straps removably attached to the fastening device, wherein a first end of each strap has a hook to engage with a respective loop disposed along the second side of the flexible wrap body, and a second end of each strap has a loop sized to allow one of the plurality of U-shaped hooks to pass through.

10. The wrapping device of claim 9, further comprising:
    a first pocket extended along the second side of the flexible wrap body, wherein the first pocket is sized to receive a first rod.

11. The wrapping device of claim 10, wherein the flexible wrap body has a second pocket extended along the first side, and the second pocket is sized to receive a second rod.

12. The wrapping device of claim 11, wherein the second slot is a C-shaped slot configured to receive the second rod.

13. The wrapping device of claim 9, wherein the first slot is a T-shaped slot.

14. The wrapping device of claim 9, wherein the U-shaped hooks have adjustment fasteners disposed at distal ends of the U-shaped hooks.

15. The wrapping device of claim 14, wherein each of the adjustment fasteners is a hexagonal nut operable to engage with a thread portion of the distal ends.

16. A wrapping device for securing goods on a transportation carrier, the wrapping device comprising:
    a flexible wrap body having a first side and a second side opposing the first side;
    a fastening device removably connected to the flexible wrap body, the fastening device being disposed along the first side of the flexible wrap body;
    a plurality of straps removably attached to the fastening device; and
    a plurality of U-shaped hooks removably attached to the fastening device, wherein each of the plurality of the U-shaped hooks is movably secured to the fastening device along the length of the fastening device, and each of the plurality of U-shaped hooks is secured to the fastening device by rotating adjustment fasteners removably disposed on each U-shaped hook.

* * * * *